United States Patent Office 2,711,921
Patented June 28, 1955

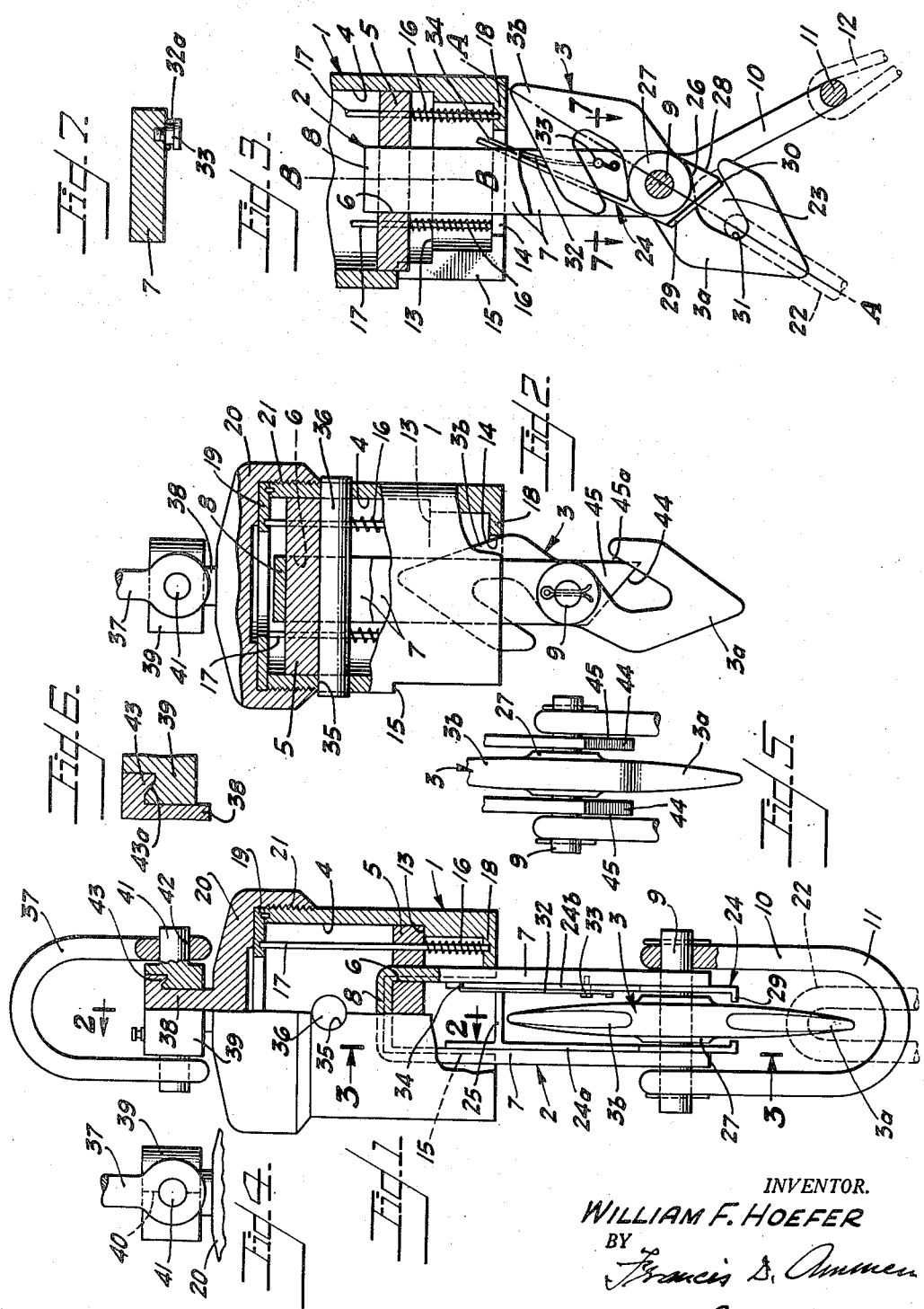

2,711,921

AUTOMATIC RELEASING HOOK FOR HOISTS AND THE LIKE

William F. Hoefer, Pasadena, Calif.

Application February 7, 1949, Serial No. 74,937

9 Claims. (Cl. 294—83)

This invention relates to a hook for carrying a load. Such hooks are used on cranes and whip hoists, for picking up and moving a load to a point where the load is deposited.

While this invention can be applied in the construction of hooks for many specific purposes, in the following specification it is described as applied to a hook that is intended primarily to be used on cranes for lifting a load, transporting the load, and depositing the load at the point where it is to be delivered.

In using an ordinary hook on a crane or whip hoist, it is necessary to have a man standing at the delivery point, who must release one end of the sling from the hook. He does this, of course, when the hook is lowered after the load is resting at the point where it is deposited.

One of the objects of this invention is to provide a hook having a construction which will enable it to automatically release itself from the load-supporting part that is carried on the hook, when the hook is relieved of the load.

Another object of the invention is to provide a hook capable of operating as an automatic releasing hook, that is provided with means capable of being employed at will, to transform the hook from an automatic releasing hook into an ordinary non-releasing hook.

Another object of the invention is to provide an automatic releasing hook with means associated with the hook-member that will enable the hook to be used as an automatic releasing hook, and if desired, also as a non-releasing hook regardless of whether the means referred to above is employed for transforming the hook from an automatic releasing hook into a regular non-releasing hook, but so constructed that by changing the manner of supporting the ends of the sling at the hook, the hook can be made to function like an ordinary hook on a hoist.

Another object of the invention is to provide a hook such as referred to above, with a guard that will prevent accidental dislodgement of a load-carrying member on the hook, from the hook in spite of the fact that the line supporting the hook may be slacked up after the hook has had the load applied to it.

Another object of the invention is to provide an improved connection for attaching the supporting collar to the upper end of the hook mechanism or pintle.

The invention consists in the novel parts and combinations of parts to be described hereinafter, all of which contribute to produce an efficient automatic releasing hook for hoists and the like.

A preferred embodiment of the invention is described in the following specification, while the broad scope of the invention is pointed out in the appended claims.

In the drawing:

Fig. 1 is an edge elevation of a hook embodying my invention, certain parts being shown broken away and partially in cross-section. In this view the parts are shown in the relation they have when a hook is supporting a load.

Fig. 2 is an elevation in partial section of the hook illustrated in Fig. 1, but looking in the direction of the arrow associated with the line 2—2 on Fig. 1. This view, however, shows the upper portion only as viewed in section on the line 2—2, while the lower portion of the casing is illustrated as broken away to about the location of the plane of the line 2—2. This view shows the hook supported in a relatively lifted position, at which time the hook will not function as an automatic releasing hook, but like an ordinary fixed hook.

Fig. 3 is a section through the lower portion of the casing taken about on the line 2—2 of Fig. 1, and illustrating a phase in the operation of the hook-member when it is about to release itself from the load automatically. In this view a portion of the shackle that supports the hook-member, is broken away. The lower portion of this view is shown as though it were a section on the line 3—3 of Fig. 1.

Fig. 4 is a fragmentary view, and illustrates details of the connection between the supporting clevis and the upper end of the casing.

Fig. 5 is a fragmentary view illustrating an embodiment of a guard which is a modification of the guard illustrated in Fig. 1.

Fig. 6 is also a fragmentary view showing a section at the supporting pintle 38, the same as shown in Fig. 1, but upon an enlarged scale.

Fig. 7 is a horizontal cross section taken on the line 7—7 of Fig. 3, through the fork of a shackle that carries the hook and illustrating how the spring for a safety guard is mounted on a fork of the shackle that carries the hook. This view is on a larger scale than Fig. 3.

Referring more particularly to the parts, I prefer to employ a casing 1 on which is guided a shackle 2 which may be regarded as a carriage for supporting the hook-member 3. This shackle is guided to move up and down on the casing, and in the present instance, in order to accomplish this, I have illustrated the casing 1 as having substantially the form of a barrel with a bore 4 which operates as a guide for a circular plunger 5. This plunger is provided with two parallel slots 6 which receive the forks 7 of the shackle, said forks being connected above by an integral cross bar 8 that rests upon the upper face of the plunger.

In the present instance, the hook-member is illustrated as being of dual or double type, that is to say, it presents two hook-portions 3a and 3b that are disposed oppositely to each other with respect to the pivotal axis that is provided for supporting the hook-member in the space between the forks 7 and on a transverse pivot pin 9 that passes through the forks of the shackle and through the hub of the hook-member 3, and the projecting ends of which may support a clevis 10 the bight 11 of which may support the upper end 12 of a sling, illustrated in dotted lines in Fig. 3.

When the load is on the hook, the plunger 5 is in a depressed position resting on a counterbore shoulder 13 (see Fig. 1).

The shackle 2 extends down through an opening 14 at the bottom end of the casing 1, and in addition to this, in the side wall at one side and substantially in the same plane in which the hook-member swings or rotates on its pivot pin 9, a relatively wide slot 15 is formed through the wall. This, as will appear hereinafter, is to enable the hook-portions 3a and 3b to pass through this slot by rotation in a clockwise direction, as viewed in Fig. 2.

The hook mechanism is provided with resilient means for lifting the plunger 5, and the shackle 2 to a raised position when the load is deposited, and the sling around the load ceases to exert a downward pull on the hook-member 3. For this purpose I prefer to provide a plurality of coil springs 16 disposed circumferentially around in the lower portion of the bore of the casing, and these springs are preferably carried on guide stems 17 which they encircle. These guide stems are socketed at their lower ends in the bottom head 18 of the casing, and at their upper ends in a washer 19 that seats on the upper end of the casing barrel and directly under the upper head 20 of the casing, which telescopes over the barrel portion of the casing, and which may be attached to the same by a screw thread 21. The washer 19 may be made of any suitable material, but if desired, may be made of dense fiber or similar material that will operate as a cushion to relieve the shock when the springs 16 carry the plunger up against the under side of this washer, as will happen when the hook-member is suddenly relieved of the load. However, a certain dash-pot effect will take place between the upper face of the plunger 5 and the under side of the head 20, which will tend to relieve any such shock.

In Fig. 3, the hook member, the shackle, and the plunger, are illustrated in the relation they will have in an early phase of the releasing operation when the load carried in the sling, is deposited, so as to relieve the clevis 10 and the hook portion 3a of downward pulling forces. In this view a link 22 is illustrated in dotted lines, which is attached to the other end of the sling, that is, located between the sling end 12 and the link 22. In this phase of the movement that releases the hook portion 3a from the sling link 22, the springs 16 are exerting their force to lift the plunger 5. In connection with this movement, it should be understood that the pull of the link 22 will be in an inclined direction by reason of its connection to the left end of the sling, and on account of this direction of pull, the longitudinal axis A—A of the hook-member will be disposed in an inclined direction, with the upper portion of the hook-member displaced laterally from the vertical axial line B—B of the shackle that passes through the central axis of the pivotal connection or pin 9. Hence, as soon as the springs 16 lift the plunger and shackle sufficiently, the upper end of the upper hook-portion 3b will strike against the bottom face of the head 18 of the casing, and as the upward movement continues, the upper end of the hook-member will "cam" itself toward the right as viewed in Fig. 3. As the upward movement of the shackle continues, the hook-member 3 will completely invert itself, and the hook-portion 3a that was supporting the load, will release itself from the link 22 and swing through the slot 15, and eventually come into the upright position that the hook-portion 3b has in Fig. 2. The latter part of this inverting movement of the hook-member can take place while the crane is moving the hook back to the loading station.

In Figs. 1 and 3 I llustrate means for guarding the throat or mouth 23 of the active, or lower, hook-portion 3a. In order to accomplish this, I prefer to employ a guard member 24 comprising two forks 24a and 24b which are parallel with each other, and which lie, respectively, against the inner faces of the forks 7 of the shackle 2. These forks are connected by a cross-bar 25 near their upper ends, and at their lower ends they are formed with hub portions or ears 26 (see Fig. 3) the upper parts of which follow the contour of the hub 27 of the hook-member, and the lower portions of which provide an edge 28 and an inwardly projecting flange portion 29, which converge toward each other and down to a point 30 that lies near the adjacent edge of the hook socket 31. These two rudimentary flanges 29 project inwardly toward the hook-member 3, and operate as barriers at the throat 23. Resilient means in the form of a wire spring 32 may be provided, having a loop attached to a screw 33 fastened onto the inner face of the right hand fork 7 of the shackle 2. The body of this wire spring 32 extends upwardly and has a bent end 34 that engages over the side face of the guard 24. By reason of the inclination of the edge 28 with respect to the edge 30 of the hook socket, it will be evident that when the rigger is loading the hook, the pressure of the link against the edge 28, will swing the upper portion of the guard 24 toward the right as viewed in Fig. 3, against the pressure of the spring and the ears 26 will move toward the left so as to permit the link to pass them.

When the inverting movement is completed, the springs 16 will carry the plunger and the shackle to a slightly higher position than as they are shown in Fig. 2. Soon after as the load is placed on the lower hook-portion 3a, the hook will be pulled down and eventually arrive at the position illustrated in Fig. 3, and in fact, slightly below that position.

In order to enable this hook to be transformed from an automatic releasing hook to a hook that will function like an ordinary "fixed" hook, I prefer to provide means for supporting the plunger 5 in an elevated position. In order to enable this to be accomplished, I form the casing 1 with a diametrically drilled opening 35 in which a friction-tight pin 36 may be placed as illustrated in Fig. 2. If this pin is inserted when the plunger 5 is in its extreme elevated position, then when the load comes on the hook, the plunger will move down and rest on the upper side of the pin 36. This pin, of course, is of sufficient diameter to enable it to support the entire load. With this pin in place when the load comes on the hook, of course the plunger moves down and is supported on the pin as illustrated in Fig. 2.

Any suitable construction may be employed for attaching the supporting clevis 37. In the present instance, the upper side of the head 20 of the casing is provided with an upwardly projecting undercut pintle 38. This pintle is encompassed by a split collar, the body of which is in the form of a block 39. This collar is split into two half sections on its medial vertical plane indicated by the line 40, and this split also passes vertically down through the two gudgeons or pins 41 that project from the side faces of the block 39, and which are received in openings 42 formed in the forks of the clevis 37.

There is, of course, sufficient metal in the pintle 38 above the supporting shoulder 43 that supports the load, to insure that the enlarged head on the pintle 38 will not be sheared from the weight of the load.

In practice, the upper clevis 37 will be forged with its openings 42 ready to be applied over the pins or gudgeons 41, with the bight of this clevis bent to a position such that the two openings 42 can be applied to the ends of the pins or gudgeons 41, after which the forks of the clevis will be pressed into a position of parallelism.

Referring to Fig. 3, it will be evident that by reversing the positions of the ends of the sling, the hook can be transformed into a non-releasing hook. After making this shift, of course the clevis 10 will extend off in an inclined direction such as is occupied by the hook-portion 3a in Fig. 3, and the hook-portion 3a will have swung through the opening in the clevis 10 and will have its axis disposed in substantially the same position as the clevis 10 in Fig. 3. Even if the springs 16 raise the shackle 2 when the load is deposited, the link 22 on the hook would not become dislodged, because if an upward movement of the shackle caused any rotation of the hook-member on the axis of the pin 9, this rotation would be in an anti-clockwise direction that would not release the link 22 from the hook.

Referring to Figs. 1 and 6, I prefer to make the supporting shoulder on the ring or block 39 of conical form, and match it up with a conical face 43a on the head of the pintle 38. When these two faces come together under the load, of course the reaction of the two faces operates to maintain the two sections of the ring or block 39 in their proper relation. In other words, this form of shoulder prevents any possibility of the ring sections spreading apart from each other.

Referring to Figs. 2 and 5, instead of employing a guard 24 constructed as a separate part, I may extend the lower ends of the shackle downwardly past the pin 9a as illustrated in these figures, and cut away its end on an inclined line 44. In this way two pointed spurs 45 are formed that project across the throat of the hook portion 3a with the faces or edges 44 substantially at right angles to the upper edge of the bill of this hook portion 3a. When a link or sling supporting member is to be hung over the bill of the hook, it is merely necessary to place it against the long edge of the shackle at the angle 45a and then pull downwardly. As this occurs, the hook will swing to the left, and as soon as the link clears the lower end of the guard, it will drop down into the socket of the hook.

Many other embodiments of the invention may be resorted to without departing from the spirit of the invention.

I claim as my invention:

1. In a releasing hook for transporting and depositing a load, the combination of a casing, a shackle guided to move up and down on the casing, a hook-member pivotally supported on the shackle, means associated with the casing for lifting the shackle and hook relative to the casing when the load is deposited, means supported on the shackle for suspending one end of a sling; said hook having a hook socket to receive and support the other end of the sling so that the force exerted by that end of the sling on the hook operates to tilt the hook into a position in which the hook is inclined to the vertical, the upper portion of said hook having a part disposed laterally with respect to a vertical line passing through the pivotal axis of the hook when in its tilted position; and said casing having a part to be engaged by the upper portion of the hook when the deposit of the load permits the upward movement of the shackle and hook, thereby effecting a swinging movement of the hook about its pivotal axis to release its end of the sling; the lower end of said casing having an opening therein to receive the upper portion of the hook-member when the lifting means lifts the shackle and the hook-member with respect to the casing; and means associated with the casing for supporting the shackle fixed in its lifted position to enable the releasing hook to be transformed into a non-releasing hook capable of being used as a fixed hook in the normal manner.

2. In a hook construction for lifting a load, the combination of a casing, a plunger guided to move up and down within the casing, a shackle suspended on said plunger, having two forks extending downward therefrom, a hook member between the forks with means for pivotally supporting the same on the forks, said hook member having a hook socket with a bill extending upwardly therefrom when the hook is in its working position supporting the load; said casing having a bottom head, a plurality of coil springs supported in the casing and thrusting upwardly for lifting the plunger and hook member when there is no load on the hook member, said casing having a stop on its inner side on which the plunger rests when a load is on the hook member, operating to support the hook in a position in which the upper end of the hook member is below the lower end of the casing; said springs operating to lift the plunger and shackle when the load on the hook is permitted to rest on a support, the lower side of said bottom head having means to cooperate with the upper end of the hook member when the shackle is raised by the springs, to swing the hook member in a direction to release it from the load.

3. In a hook construction for lifting a load, the combination of a casing, a plunger guided to move up and down in the casing, and having two openings therethrough, a shackle having an upper crossbar with forks extending downward therefrom and lying in said openings, a hook member between the forks with means for pivotally supporting the same on the forks, said hook member having a hook socket with a bill extending upwardly therefrom when the hook is in its working position supporting the load; said casing having a bottom head, a plurality of guide stems socketed in said bottom head, said plunger having openings through which said stems extend upwardly to the upper end of said casing, a plurality of coil springs on said stems thrusting at their lower ends against the bottom head and at their upper ends against the under side of the plunger, said casing having a stop on its inner side on which the plunger rests when a load is on the hook member, said hook member being disposed below the lower end of the casing when a load is on the hook; said springs operating to lift the plunger and the shackle when the load on the hook is permitted to rest on a support, the lower side of said bottom head having means to cooperate with the upper end of the hook member when the shackle is raised by the springs, to swing the hook member in a direction to release it from the load.

4. In a hook construction for lifting a load, the combination of a casing, a plunger guided to move up and down within the casing, a shackle suspended on said plunger, having two forks extending downward therefrom, a hook member between the forks with means for pivotally supporting the same on the forks, said hook member having a hook socket with a bill extending upwardly therefrom when the hook is in its working position supporting the load; said casing having a bottom head with a substantially horizontal bottom face, a plurality of coiled springs supported in the casing and thrusting upwardly against the plunger for lifting the plunger and hook member when there is no load on the hook member, said casing having a stop shoulder on its inner side on which the plunger rests when the load is on the hook member, operating to support the hook in a position in which the upper end of the hook member lies below the lower end of the casing; said springs operating to lift the plunger and shackle when the load on the hook is permitted to rest on a support, said horizontal bottom face operating when engaged by the upper end of the hook member to swing the hook member in a direction to release it from the load when the shackle is raised by the springs.

5. A releasing hook according to claim 8, including means associated with the casing for supporting the shackle fixed on the casing in an elevated position, said means capable of supporting the load and enabling the hook to be used as a fixed non-releasing hook.

6. In a hook construction for lifting, transporting, and releasing a load, the combination of a shackle with two forks extending downwardly, a casing with means for supporting the shackle from above, and having means for guiding the same to move up and down thereon, a pair of integrally connected hooks with means for pivotally supporting the same on and between the forks, each hook having a hook socket with a bill extending upwardly therefrom when its hook socket is in its low working position in which position it can support a load; a guard-member supported on the shackle to swing on an axis and located between said forks, said guard-member having an extension projecting down alongside the path of the hooks and below the pivotal support, said extension capable of projecting across the mouth of the hook at the sides thereof to operate as a barrier across the mouth thereof for either hook when in its low working position, and means for yieldingly holding the guard-member in position to maintain the barrier across the throat of the hook, and operating so that a ring to be supported in either hook socket in its low position can move the barrier in a direction to permit the ring to move past said extension to be caught in the hook socket; and automatic means for raising the shackle relatively to the casing when the load rests upon a support, and for effecting the rotation of the hooks on their pivotal axis in a direction to move the lower hook away from the guard to release the load from the hook.

7. In a hook construction for lifting, transporting, and releasing a load, the combination of a casing, a shackle having two forks extending downwardly and guided to move up or down on said casing, a hook with means for pivotally supporting the same on the forks to swing on a horizontal axis located in the space between the forks, said hook having a hook socket with a bill extending upwardly therefrom when the hook is in its working position supporting a load; means for raising the shackle in the casing when the load rests on its support, said hook and said casing having means co-operating when the hook rises with the shackle, to swing the hook on said horizontal axis, a guard-member supported on the shackle to swing on an axis and located between said forks, said guard-member having an extension projecting down alongside the hook below the pivotal support for the hook capable of operating as a barrier to close the mouth of the hook, the said rotation of the hook operating to move the hook away from the guard to release the load from the hook, and means for yieldingly holding the guard-member in the position to maintain the barrier across the throat of the hook and operating so that a ring to be supported on the hook socket can move the barrier in a direction to permit the ring to pass it and into the socket.

8. In a releasing hook for transporting and depositing a load carried in a sling the ends of which converge at the hook, the combination of a casing, a shackle supported in the casing and guided to move up and down on the same, a dual form hook member pivotally supported to rotate about an axis on the shackle, lifting means associated with the casing for lifting the shackle and hook member relative to the casing when the load is deposited, means supported on the shackle for suspending one end of the sling; said hook member having a hook socket to receive and support the other end of the sling so that the force exerted by that end of the sling on the hook member operates to move the hook into a tilted position in which the hook member is inclined to a vertical line passing up through the axis of rotation of the hook member, said hook member having two hook portions with shanks extending in opposite directions away from the pivotal support, and a bill integral with each shank projecting in an inclined direction from the shank, the junction of each bill and each corresponding shank forming a hook socket; the tip of the upper hook portion being laterally out of line with the tip of the lower hook portion when the hook member is held in said tilted position; and the end wall of said casing having a substantially horizontal bottom face to be engaged by the tip of the upper hook portion when the hook member is depositing the load, so that the lifting means raises the shackle and hook member, the upward movement of said shackle by the said lifting means operating to effect rotation of the hook member on its said pivotal axis and remove the lower hook from its end of the sling.

9. A releasing hook according to claim 8 in which the said casing has a clearance slot in its lower end at its side to permit the hook portion that is swinging upwardly on the axis of rotation of the hook member to pass up into the casing when the unloaded hook is coming to rest.

References Cited in the file of this patent

UNITED STATES PATENTS

| | | |
|---|---|---|
| 441,255 | Prichard | Nov. 25, 1890 |
| 555,462 | Morrow | Feb. 25, 1896 |
| 986,388 | Heggem | Mar. 7, 1911 |
| 1,221,693 | Crosby | Apr. 3, 1917 |
| 1,273,717 | Anderson et al. | July 23, 1918 |
| 1,457,648 | Bailey | June 5, 1923 |
| 1,667,927 | Clarke | May 1, 1928 |
| 1,862,312 | Kositsky | June 7, 1932 |
| 2,488,537 | Hattan | Nov. 22, 1949 |

FOREIGN PATENTS

| | | |
|---|---|---|
| 282,627 | Germany | Mar. 11, 1915 |
| 34,644 | Sweden | of 1913 |
| 118,798 | Switzerland | Jan. 17, 1926 |